United States Patent
Young

(10) Patent No.: US 12,101,794 B2
(45) Date of Patent: *Sep. 24, 2024

(54) COMMUNICATION IN A WIRELESS NETWORK USING RESTRICTED BANDWIDTHS

(71) Applicant: Intellectual Ventures Holding 81 LLC, Carson City, NV (US)

(72) Inventor: Philip Young, Alton (GB)

(73) Assignee: Intellectual Ventures Holding 81 LLC, Carson City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,172

(22) Filed: Dec. 22, 2023

(65) Prior Publication Data

US 2024/0129937 A1    Apr. 18, 2024

Related U.S. Application Data

(63) Continuation of application No. 18/136,140, filed on Apr. 18, 2023, now Pat. No. 11,856,593, which is a
(Continued)

(30) Foreign Application Priority Data

Jan. 20, 2012    (GB) .................................... 1201000

(51) Int. Cl.
*H04W 72/51* (2023.01)
*H04L 5/00* (2006.01)
(Continued)

(52) U.S. Cl.
CPC ........... *H04W 72/51* (2023.01); *H04L 5/0005* (2013.01); *H04L 5/0037* (2013.01);
(Continued)

(58) Field of Classification Search
CPC ................................ H04W 72/51; H04W 4/70
See application file for complete search history.

(56) References Cited

U.S. PATENT DOCUMENTS

| 6,393,544 B1 | 5/2002 | Bryg et al. |
| 6,629,222 B1 | 9/2003 | Jeddeloh |
(Continued)

FOREIGN PATENT DOCUMENTS

| WO | 2005/109203 | 11/2005 |
| WO | 2011/146766 | 11/2011 |
| WO | 2012/023895 | 2/2015 |

OTHER PUBLICATIONS

Arm Limited, ARM1176JZF-S (Revision r0p7) Technical Reference Manual (2009).
(Continued)

*Primary Examiner* — Sulaiman Nooristany
(74) *Attorney, Agent, or Firm* — Volpe Koenig

(57) ABSTRACT

A base station is configured to transmit at least one signal in a first bandwidth portion of a cell, the at least one signal having a primary synchronization signal (PSS), a secondary synchronization signal (SSS) and a physical broadcast channel (PBCH). The PBCH including a master information block (MIB), the MIB having an indication of time and frequency resources in relation to the at least one signal to acquire additional system information, the first bandwidth portion having a bandwidth less than a full bandwidth of the cell. The base station is further configured to transmit in time and frequency resources associated with the indication of the time and frequency resources and additional system information. The additional system information indicates a second bandwidth portion of the cell, the acquired additional system information being acquired within the second bandwidth portion.

6 Claims, 8 Drawing Sheets

Related U.S. Application Data continuation of application No. 17/566,059, filed on Dec. 30, 2021, now Pat. No. 11,638,295, which is a continuation of application No. 17/185,533, filed on Feb. 25, 2021, now Pat. No. 11,252,732, which is a continuation of application No. 16/190,420, filed on Nov. 14, 2018, now Pat. No. 10,939,446, which is a continuation of application No. 14/372,363, filed as application No. PCT/GB2013/050126 on Jan. 21, 2013, now abandoned.

(51) Int. Cl.
  *H04W 4/70* (2018.01)
  *H04W 72/1263* (2023.01)

(52) U.S. Cl.
  CPC ............. *H04L 5/0092* (2013.01); *H04W 4/70* (2018.02); *H04W 72/1263* (2013.01)

(56) References Cited

U.S. PATENT DOCUMENTS

| | | |
|---|---|---|
| 6,742,103 B2 | 5/2004 | Chauvel et al. |
| 6,850,540 B1 | 2/2005 | Peisa et al. |
| 6,938,130 B2 | 8/2005 | Jacobson et al. |
| 7,003,699 B2 | 2/2006 | Swaine et al. |
| 7,305,534 B2 | 12/2007 | Watt et al. |
| 7,380,098 B1 | 5/2008 | Anvin et al. |
| 7,499,438 B2 | 3/2009 | Hinman et al. |
| 7,646,835 B1 | 1/2010 | Rozas |
| 7,793,347 B2 | 9/2010 | Rozas |
| 7,966,467 B1 | 6/2011 | Ludloff et al. |
| 8,249,635 B2 | 8/2012 | Fukui et al. |
| 8,522,253 B1 | 8/2013 | Rozas et al. |
| 8,898,395 B1 | 11/2014 | Rozas |
| 8,923,274 B2 | 12/2014 | Wang et al. |
| 9,094,991 B2 | 7/2015 | Gheorghiu et al. |
| 9,131,503 B2 | 9/2015 | Ishii et al. |
| 9,681,466 B2 | 6/2017 | Speight |
| 9,706,500 B2 | 7/2017 | Anderson |
| 10,939,446 B2 | 3/2021 | Young |
| 2002/0090022 A1 | 7/2002 | Yano et al. |
| 2004/0123207 A1 | 6/2004 | Zumkehr et al. |
| 2007/0258417 A1 | 11/2007 | Harvey et al. |
| 2007/0258433 A1 | 11/2007 | Speight |
| 2008/0069060 A1 | 3/2008 | Das et al. |
| 2008/0130486 A1 | 6/2008 | Lim et al. |
| 2008/0232240 A1 | 9/2008 | Baum et al. |
| 2009/0180430 A1 | 7/2009 | Fadell |
| 2009/0247171 A1 | 10/2009 | Suga |
| 2010/0015969 A1 | 1/2010 | Lee et al. |
| 2010/0022250 A1* | 1/2010 | Petrovic ............... H04J 11/0093 455/450 |
| 2010/0029283 A1 | 2/2010 | Iwamura |
| 2010/0130218 A1 | 5/2010 | Zhang et al. |
| 2010/0135242 A1 | 6/2010 | Nam et al. |
| 2010/0220607 A1 | 9/2010 | Fujishima et al. |
| 2010/0232524 A1* | 9/2010 | Chen ................. H04W 72/0453 375/259 |
| 2010/0317283 A1 | 12/2010 | Wu |
| 2010/0323633 A1 | 12/2010 | Pani et al. |
| 2010/0323709 A1 | 12/2010 | Nam et al. |
| 2011/0085457 A1 | 4/2011 | Chen et al. |
| 2011/0105119 A1 | 5/2011 | Bienas et al. |
| 2011/0194515 A1 | 8/2011 | Nakao et al. |
| 2011/0255425 A1 | 10/2011 | Pikkarainen et al. |
| 2011/0274063 A1 | 11/2011 | Li |
| 2011/0317581 A1 | 12/2011 | Hoshino et al. |
| 2011/0319030 A1 | 12/2011 | Kondo et al. |
| 2012/0044852 A1 | 2/2012 | Zhang et al. |
| 2012/0155361 A1 | 6/2012 | Wei et al. |
| 2012/0157090 A1 | 6/2012 | Kim et al. |
| 2012/0213143 A1 | 8/2012 | Zhang et al. |
| 2012/0250564 A1 | 10/2012 | Marque-Pucheu et al. |
| 2012/0263093 A1 | 10/2012 | Roessel et al. |
| 2012/0289286 A1 | 11/2012 | Miki |
| 2012/0327894 A1* | 12/2012 | Axmon ................. H04W 72/53 370/329 |
| 2012/0327895 A1* | 12/2012 | Wallen ................. H04W 48/12 370/329 |
| 2013/0064119 A1 | 3/2013 | Montojo et al. |
| 2013/0083749 A1 | 4/2013 | Xu et al. |
| 2013/0088986 A1 | 4/2013 | Xiao et al. |
| 2013/0114555 A1 | 5/2013 | Sato |
| 2013/0114587 A1 | 5/2013 | Khoryaev et al. |
| 2013/0242821 A1 | 9/2013 | Wei et al. |
| 2014/0036851 A1 | 2/2014 | Seo et al. |
| 2014/0094183 A1 | 4/2014 | Gao et al. |
| 2014/0307697 A1 | 10/2014 | Beale |

OTHER PUBLICATIONS

Arm Limited, ETM7 (Rev 1) Technical Reference Manual (2001).

Dahlman et al., "Access Procedures (Chapter 14)," 4G LTE/LTE-Advanced for Mobile Broadband, Academic Press in Elsevier, p. 301-321 (Mar. 2011).

Huawei et al., "Considerations on the bandwidth reduction for low cost MTC UE," 3GPP TSG RAN WG1#67, R1-113659, San Francisco, USA (Nov. 14-18, 2011).

Huawei Technologies, "Logical channel soft priority and power allocation," 3GPP TSG RAN WG2 Meeting #43, R2-041531, Prague, Czech Republic (Aug. 16-20, 2004).

NTT Docomo, "Issues Regarding LTE Network for Low Cost MTC," 3GPP TSG RAN WG1 Meeting #67, R1-114082, San Francisco, USA (Nov. 14-18, 2011).

Third Generation Partnership Project, "Technical Specification Group Radio Access Network; RRC Protocol Specification (3G TS 25.331 version 3.1.0 Release 1999)," 3G TS 25.331 V3.1.0 (Jan. 2000).

Third Generation Partnership Project, "Technical Specification Group (TSG) RAN WG4 UE Radio transmission and Reception (FDD)," TS 25.101 V3.1. 0 (Dec. 1999).

Third Generation Partnership Project, "Technical Specification Group Radio Access Network; Radio Resource Control (RRC); Protocol specification (Release 11)," 3GPP TS 25.331 V11.0.0 (Dec. 2011).

Third Generation Partnership Project, "Technical Specification Group Radio Access Network; Radio Resource Control (RRC); Protocol specification (Release 11)," 3GPP TS 25.331 V11.4.0 (Dec. 2012).

Third Generation Partnership Project, "Technical Specification Group Radio Access Network; User Equipment (UE) radio transmission and reception (FDD) (Release 11)," 3GPP TS 25.101 V11.4.0 (Dec. 2012).

Third Generation Partnership Project, "Technical Specification Group Radio Access Network; User Equipment (UE) radio transmission and reception (FDD) (Release 11)," 3GPP TS 25.101 V11.0.0 (Dec. 2011).

U.S. Appl. No. 14/372,363, Final Rejection, mailed Dec. 16, 2016.
U.S. Appl. No. 14/372,363, Final Rejection, mailed Jun. 14, 2018.
U.S. Appl. No. 14/372,363, Non-Final Rejection, mailed Mar. 11, 2016.
U.S. Appl. No. 14/372,363, Non-Final Rejection, mailed Aug. 18, 2017.
U.S. Appl. No. 16/190,420, Final Rejection, mailed Feb. 3, 2020.
U.S. Appl. No. 16/190,420, Non-Final Rejection, mailed Aug. 20, 2019.
U.S. Appl. No. 16/190,420, Non-Final Rejection, mailed Jun. 17, 2020.
U.S. Appl. No. 16/190,420, Notice of Allowance, mailed Oct. 26, 2020.
U.S. Appl. No. 17/184,127, Non-Final Rejection, mailed May 17, 2021.
U.S. Appl. No. 17/184,134, Non-Final Rejection, mailed May 17, 2021.
U.S. Appl. No. 17/185,442, Non-Final Rejection, mailed May 3, 2021.
U.S. Appl. No. 17/185,533, Non-Final Rejection, mailed May 3, 2021.

(56) References Cited

OTHER PUBLICATIONS

U.S. Appl. No. 17/185,533, Notice of Allowance, mailed Sep. 9, 2021.
U.S. Appl. No. 17/566,059, Final Rejection, mailed May 27, 2022.
U.S. Appl. No. 17/566,059, Non-Final Rejection, mailed Feb. 28, 2022.
U.S. Appl. No. 17/566,059, Non-Final Rejection, mailed Oct. 11, 2022.
U.S. Appl. No. 17/566,059, Notice of Allowance, mailed Jan. 27, 2023.
U.S. Appl. No. 18/136,140, Notice of Allowance, mailed Aug. 11, 2023.

* cited by examiner

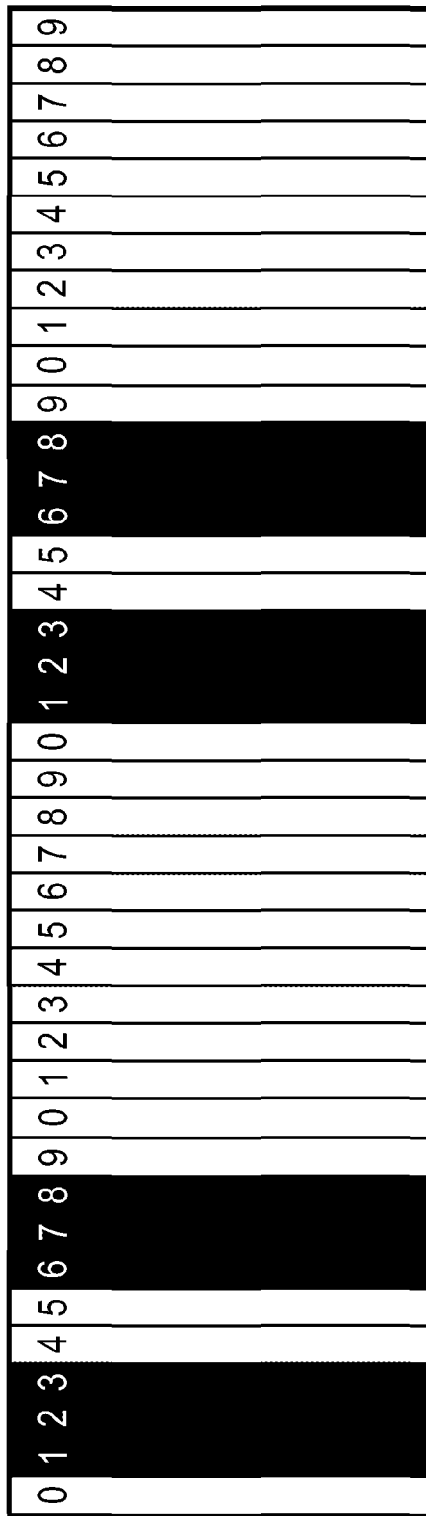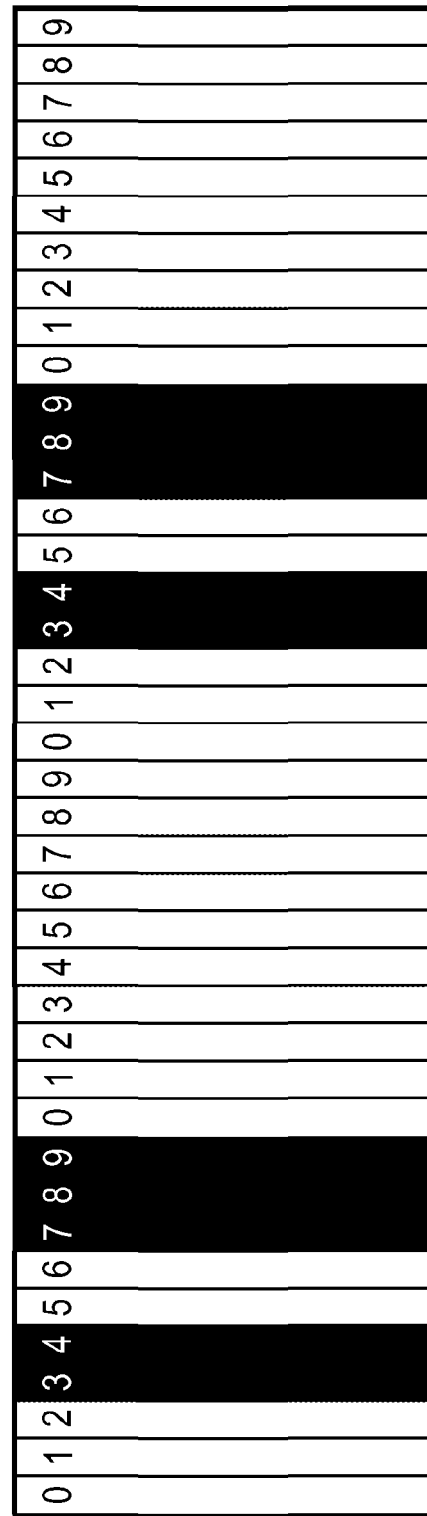

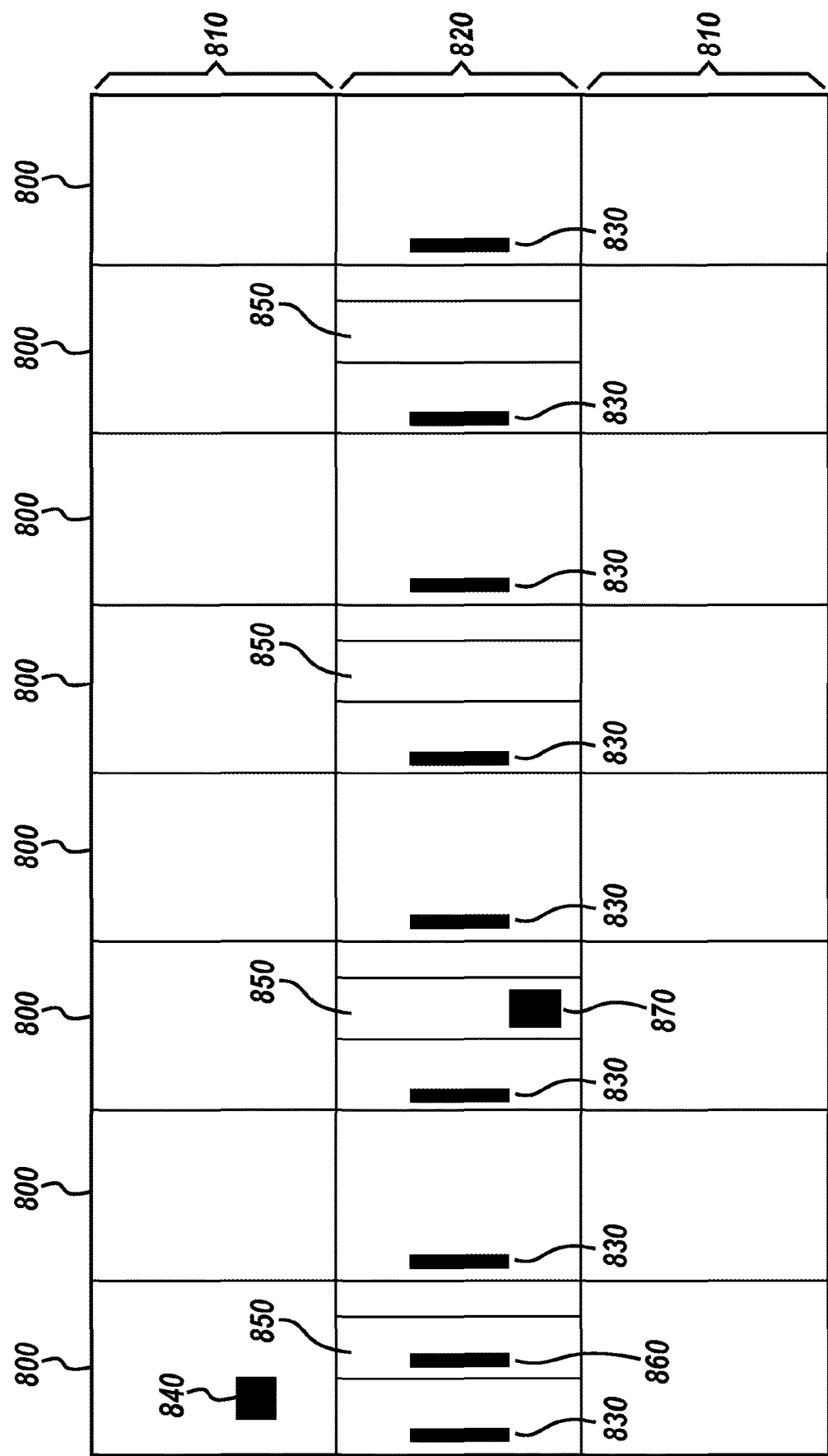

COMMUNICATION IN A WIRELESS NETWORK USING RESTRICTED BANDWIDTHS

CROSS REFERENCE TO RELATED APPLICATION

This application is a continuation of U.S. patent application Ser. No. 18/136,140, filed Apr. 18, 2023, which will issue as U.S. Pat. No. 11,856,593 on Dec. 26, 2023, which is a continuation of U.S. patent application Ser. No. 17/566,059, filed Dec. 30, 2021, which issued as U.S. Pat. No. 11,638,295 on Apr. 25, 2023, which is a continuation of U.S. patent application Ser. No. 17/185,533, filed Feb. 25, 2021, which issued as U.S. Pat. No. 11,252,732 on Feb. 15, 2022, which is a continuation of U.S. patent application Ser. No. 16/190,420, filed Nov. 14, 2018, which issued as U.S. Pat. No. 10,939,446 on Mar. 2, 2021, which is a continuation of U.S. patent application Ser. No. 14/372,363, filed Jul. 15, 2014, now abandoned, which is a § 371 application of International Application No. PCT/GB2013/050126, filed Jan. 21, 2013, claiming priority to Great Britain Application No. 1201000.5, filed Jan. 20, 2012, which are incorporated by reference as if fully set forth.

FIELD OF INVENTION

The present invention relates to wireless communications systems and methods, and in particular to a system, method, base station and terminal device for communicating using a subordinate carrier of a host carrier.

BACKGROUND OF THE INVENTION

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, also known as machine-to-machine (M2M) communications, some of which are in some respects typified by semi-autonomous or autonomous wireless communication devices (i.e. MTC devices) communicating small amounts of data on a relatively infrequent basis. Examples include so-called smart meters which, for example, are located in a customer's home and periodically transmit data back to a central MTC server relating to the customer's consumption of a utility such as gas, water, electricity and so on.

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by a MTC-type terminal (e.g. simple collection and reporting of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks.

SUMMARY OF THE INVENTION

According to a first aspect of the invention there is provided a wireless communications system, comprising a base station, one or more terminal devices of a first type and one or more terminal devices of a second type. The base station is operable to communicate with the terminal devices of the first type using a host carrier comprising radio resource segments distributed in time, each radio resource segment providing radio resources across a first frequency band. The base station is operable to communicate with the terminal devices of the second type using a subordinate carrier comprising radio resources within a second frequency band of a subset of the radio resource segments of the host carrier, the second frequency band being narrower than and contained within the first frequency band.

In this way, an efficient and flexible mechanism for specifying and controlling an amount and location of radio resources to be dedicated to a subordinate earner for use by a particular (e.g. reduced capability) type of device can be provided.

One way of achieving this differentiated access between the terminal devices of the first type and second type is to allocate a part of the carrier resource that is dedicated to the second type of device (e.g. MTC traffic) using normal eNB (base station) scheduling. The eNB differentiates between MTC and non-MTC (example of the first type of device) UEs and only schedules MTC UEs within the reserved part of the earner resource and only schedules non-MTC UEs outside of the reserved part of the carrier resource. While this solution is viable, the simple scheduling approach places some restrictions on the MTC subordinate carrier that can be realised. For instance, it would be necessary to use the same carrier characteristics and/or reference signals. If it were advantageous to use different carrier characteristics or to use additional or modified reference signals then this may not be possible in an MTC subordinate carrier implemented purely by eNB scheduling.

The radio resource segments may be sub-frames of radio frames, each radio frame comprising a plurality of sub-frames. In this case, the sub-frames may be allocated to the subordinate carrier using a subordinate carrier sub-frame allocation set, the subordinate carrier sub-frame allocation set determining which sub frames within a repeating group of one or more radio frames are allocated to the subordinate carrier. The subordinate carrier sub-frame allocation set may be defined by one or more reserved sub-frame allocation patterns. The one or more reserved sub-frame allocation patterns may comprise all or a sub-set of all reserved sub-frame allocation patterns defined for the host carrier.

In one example, the subframes selected for the subordinate carrier are so-called MBSFN (Multimedia Broadcast/multicast service over a Single Frequency Network) sub-frames. This embodiment relies on the fact that such subframes do not have to be used exclusively for MBSFN. The LTE Rel. 8/9/10 specifications define a means (in the standard LTE SystemInformationBlockType2—SIB2) by which certain subframes can be excluded from normal allocation to the Physical Downlink Shared Channel (PDSCH). Furthermore, the specifications define signalling within the standard system information which allows some or all of these excluded subframes to be used for other defined purposes, such as MBMS (in SystemInformation-BlockType13—SIB 13), relay and positioning reference signal transmission. However, reading of this system information may require reception across the whole carrier bandwidth.

Acquisition information required for a terminal device of the second type to receive the subordinate carrier may be allocated for inclusion in sub-frames of the subordinate carrier using at least a portion of the subframes in one or more of the reserved sub-frame allocation patterns defining the subordinate carrier.

The base station may be operable to transmit an indication of the radio resources of all reserved sub-frames to terminal devices of the first type. In this way, the first type of device is informed of subframes which are reserved for the subordinate carrier, another subordinate carrier, and for other purposes such as relay backhaul. A particular device of the first type is not required to know why a particular sub-frame is reserved, merely that it is not available to that device. This indication may be presented to the terminal devices of the first type as a reserved subframe allocation within a system information block transmitted using frequency resources not necessarily limited to the second frequency band of the subordinate carrier. In this way, it is possible to exclude non-MTC devices from a resource reserved for the subordinate carrier.

The base station may be operable to transmit, using radio resources within the second frequency band, subordinate carrier information indicating that a subordinate carrier is available within the host carrier. A terminal device of the second type may be responsive to subordinate carrier information indicating that a subordinate carrier is not available within the host carrier to terminate a camp-on procedure for camping on to the network.

The subordinate carrier information may be provided within first acquisition information transmitted on radio resources within the second frequency band, the first acquisition information being required for a terminal device of the first type to receive the system information of the host carrier. The first acquisition information may be a master information block transmitted on a physical broadcast channel within radio resources of the host earner. In this way it is possible to signal via the first acquisition information, to terminal devices of the second type, the presence of an MTC subordinate carrier existing within the reserved resource and using only a restricted bandwidth. If the subordinate carrier information is not present then the camp-on process by a terminal device may be terminated early, thereby reducing time and power wastage at the terminal device.

The first type of terminal device may be capable of receiving the full bandwidth of the first frequency band, and the second type of terminal device may not be capable of receiving the full bandwidth of the first frequency band but be capable of receiving the full bandwidth of the second frequency band. The bandwidth of the subordinate carrier may be predetermined and be known in advance to terminal devices of the second type. Alternatively, the base station may be operable to transmit, using radio resources within the second frequency band, an indication of the bandwidth of the subordinate carrier. In this case the bandwidth need not necessarily be predetermined. The indication of the bandwidth of the subordinate carrier may be provided within first acquisition information transmitted on radio resources within the second frequency band, the acquisition information being provided to permit a terminal device of the first type to receive the host carrier downlink and camp on to the host carrier. Alternatively, the base station may be operable to transmit, using radio resources of the subordinate carrier, an indication of the bandwidth of the subordinate carrier.

The base station may be operable to transmit, using radio resources of the subordinate carrier, second acquisition information required for a terminal device of the second type to receive the subordinate carrier downlink and camp on to the subordinate carrier. The second acquisition information may be transmitted on predetermined radio resources which are known in advance to terminal devices of the second type. The second acquisition information may comprise an indication of the bandwidth of the subordinate carrier. In this way, it is possible to signal system information defining the characteristics of the MTC subordinate carrier using only resources within the MTC subordinate carrier.

The radio resource segments may be sub-frames of radio frames in the time direction, each radio frame comprising a plurality of sub-frames. The second acquisition information may be transmitted in at least some of the sub-frames allocated to the subordinate carrier. A terminal device of the second type may be operable to determine whether a sub-frame contains second acquisition information from a current radio frame number and a first sub-frame allocation set for allocating the second acquisition information to sub-frames within the subordinate carrier, said first sub-frame allocation set identifying which sub-frames within a repeating group of one or more radio frames contain the second acquisition information.

The current radio frame number may be determined from first acquisition information transmitted on radio resources within the second frequency band, the first acquisition information being required for a terminal device of the first type to receive the host carrier downlink and camp on to the network. The first sub-frame allocation set may be predetermined and known in advance to terminal devices of the second type. The second acquisition information may comprise an indication of the current radio frame number.

Accordingly, once the second acquisition information is available to a mobile terminal, it may from that point on obtain the current radio frame number from the second acquisition information rather than having to refer back to the first acquisition information.

A terminal device of the second type may be operable to determine whether a sub-frame is allocated to the subordinate carrier from a current radio frame number and a second sub-frame allocation set for the subordinate carrier, said second sub-frame allocation set identifying which sub-frames within a repeating group of one or more radio frames are allocated to the subordinate carrier. The current radio frame number may be determined from the second acquisition information. Alternatively, the current radio frame number may be determined from the first acquisition information and updated by counting radio frames.

The second sub-frame allocation set may be predetermined and known in advance to terminal devices of the second type. Alternatively, the second sub-frame allocation set may be specified in the second acquisition information. It will be appreciated that the second sub-frame allocation set may be different to the first sub-frame allocation set, but will include all of the sub-frames of the first sub-frame allocation set (and probably additional sub-frames as well).

The first type of terminal device may be an LTE device and the second type of device may be a low data rate device. The first type of terminal device may be an LTE device and the second type of device may be a low data rate device for providing machine-to-machine (M2M) communication.

It will be appreciated that different radio resource segments of the same or a different frequency band may be used to support a further subordinate carrier.

At least a portion of the radio resources outside of the second frequency band of the subset of the radio resource segments of the host earner allocated to the subordinate carrier may be allocated to another subordinate carrier. In other words, a different frequency band of the same resource segments (in time) may support another carrier.

At least a portion of the radio resources outside of the second frequency band of the subset of the radio resource segments of the host carrier allocated to the subordinate carrier may be used for communicating with terminal devices of the first type. In other words, a different frequency band of the same resource segments (in time) may support the host carrier.

Viewed from another aspect, there is provided a base station for communicating with terminal devices. The base station is operable to communicate with terminal devices of a first type using a host carrier comprising radio resource segments distributed in time, each radio resource segment providing radio resources across a first frequency band. The base station is operable to communicate with terminal devices of a second type using a subordinate carrier comprising radio resources within a second frequency band of a subset of the radio resource segments of the host carrier, the second frequency band being narrower than and contained within the first frequency band.

Viewed from another aspect, there is provided a terminal device for communicating with a base station which supports a host carrier comprising radio resource segments distributed in time, each radio resource segment providing radio resources across a first frequency band. The terminal device is operable to communicate with the base station using a subordinate carrier comprising radio resources within a second frequency band of a subset of the radio resource segments of the host carrier, the second frequency band being narrower than and contained within the first frequency band.

Viewed from another aspect, there is provided a method of communicating between a base station and terminal devices of a first type and a second type. The method comprises communicating between the base station and terminal devices of a first type using a host carrier comprising radio resource segments distributed in time, each radio resource segment providing radio resources across a first frequency band, and communicating between the base station and terminal devices of a second type using a subordinate carrier comprising radio resources within a second frequency band of a subset of the radio resource segments of the host carrier, the second frequency band being narrower than and contained within the first frequency band.

Viewed from another aspect, there is provided a method of communicating with a base station from a terminal device, comprising communicating with the base station using a subordinate carrier of a host carrier comprising radio resource segments distributed in time, each radio resource segment of the host carrier providing radio resources across a first frequency band, the subordinate carrier comprising radio resources within a second frequency band of a subset of the radio resource segments of the host carrier, the second frequency band being narrower than and contained within the first frequency band.

It will be appreciated that features of the above-described aspects and embodiments of the invention may be combined with features of other aspects and embodiments of the invention as appropriate and in combinations other than those explicitly set out. For example, optional features of the first aspect of the invention may equally optionally be incorporated in embodiments according to other aspects of the invention, for example where the different aspects have corresponding features.

BRIEF DESCRIPTION OF THE DRAWINGS

Example embodiments of the present invention will now be described with reference to the accompanying drawings in which like parts have the same designated references and in which:

FIGS. 5A to 5D schematically illustrate example allocations of resources to the subordinate carrier;

FIG. 8 schematically illustrates a signalling configuration according to an embodiment of the invention.

DETAILED DESCRIPTION OF THE EXAMPLE EMBODIMENTS

Network Structure

Embodiments of the present invention are described herein with particular reference to an example implementation in a wireless communication system having carriers based around the 3GPP Long Term Evolution (LTE) standard.

Figure 1:
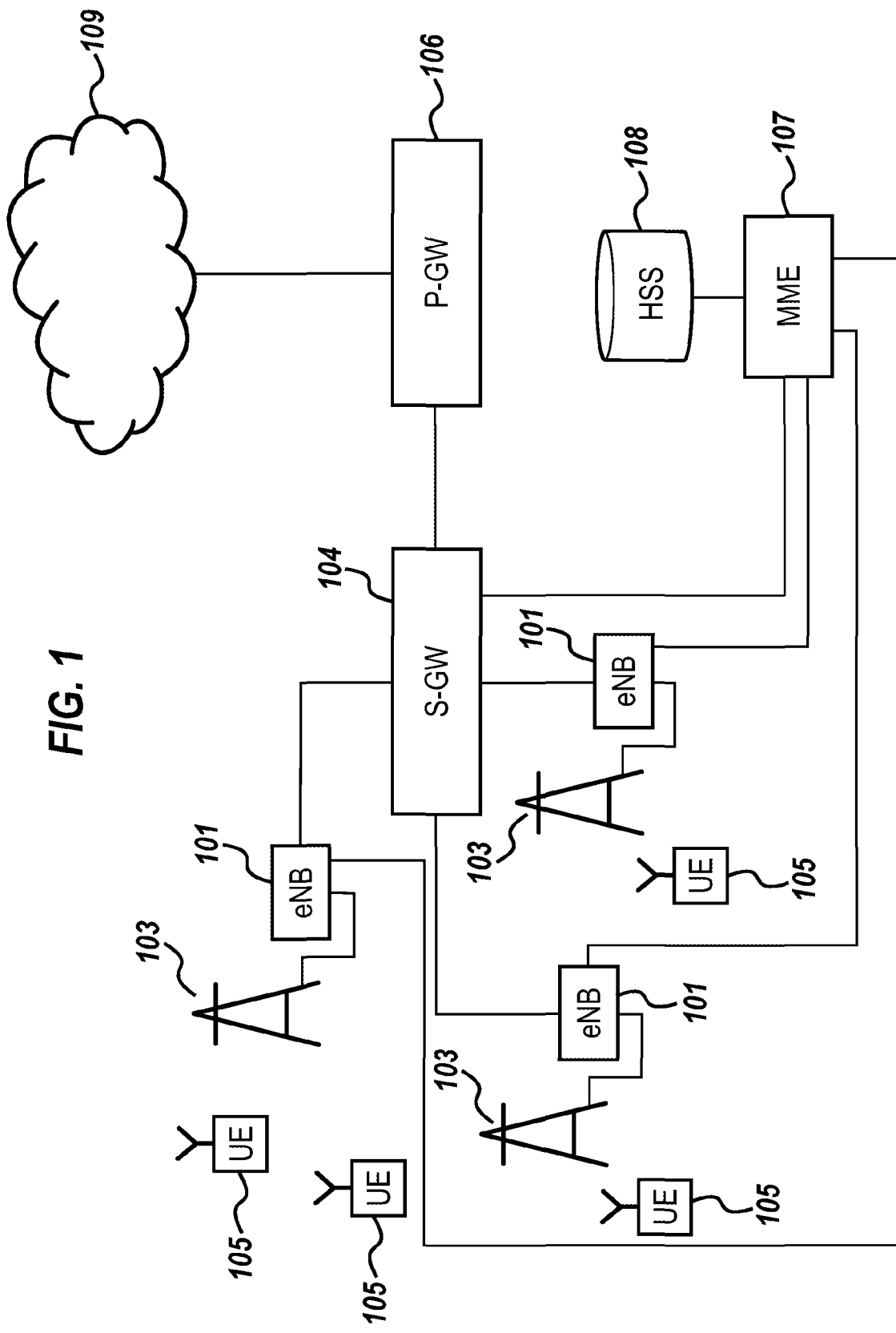
FIG. 1 is a schematic block diagram of a radio network and a plurality of user equipments forming a wireless communication system which operates in accordance with the 3GPP Long Term Evolution (LTE) standard.

FIG. 1 schematically shows an example architecture of an LTE system. The LTE system is provided by a telecommunications network operator to allow parties to communicate. As shown in FIG. 1, mobile communications devices designated as user equipment (UE) 105 are arranged to communicate data to and from base stations (transceiver stations) 101 which are frequently referred to in LTE as E-UTRAN NodeBs (e-nodeB). Each of the base stations 101 comprises a transceiver unit 103 enabling communication of data to and from a plurality of mobile communication devices via a radio interface. The e-nodeBs 101 are connected to a serving gateway S-GW 104 and to a mobility management entity (MME) 107. The S-GW 104 is arranged to perform routing and management of mobile communications services to the communications devices 105 in the mobile radio network. In order to maintain mobility management and connectivity, the mobility management entity (MME) 107 manages evolved packet system (EPS) connections with the communications devices 105 using subscriber information stored in a home subscriber server (HSS) 108. Other core network components include a packet data network gateway (P-GW) 106 which connects to an internet network 109 and finally to an external server (not shown). In the context of MTC communications a UE supporting MTC communications may, for example, be conveniently referred to as an MTC terminal or MTC UE, and a server with which the MTC terminal(s) communicate data may, for example, be conveniently referred to as an MTC server. More generally, devices in the system capable of supporting MTC communications may be referred to as MTC entities. The various elements of FIG. 1 and their respective modes of operation are well-known and defined in the relevant standards administered by the 3GPP® body and also described in many books on the subject, for example, Holma H. and Toskala A [1]. These conventional aspects of LTE networks are not described further in the interest of brevity.

Two classes of device are considered herein. A first class of device is configured to communicate via a host carrier, and a second class of device is configured to communicate via a subordinate carrier. In some of the particular examples considered here, the first class of device and the host carrier are compliant with particular standards, for example, LTE Rel. 8/9/10 standards, and the second class of device and the subordinate carrier are compliant with modified versions of these particular standards, for example, based on versions of the standards modified to support lower-capability devices. Accordingly, and purely for the sake of reference and to aid explanation, the first class of device and the host carrier may be referred to here in some examples as legacy devices and legacy carrier, while the second class of device and the subordinate carrier may be referred to in some examples as MTC devices and MTC carrier (or in alternative DMN (Dedicated Messaging Network) devices and DMN carrier). However, it will be appreciated that these terms are simply used as labels for ease of explanation of particular implementations of embodiments of the invention for distinguishing the two classes of device and carrier. Thus, the term "legacy" should not be considered as indicating any form of obsolescence, and indeed the devices and carrier(s) referred to here as legacy devices and carrier(s) may equally correspond with devices and carrier(s) that comply with future releases of the LTE standards, for examples Rel. 11 and beyond. Equally, and as already noted above, DMN should not be taken to refer to a network which exclusively supports only basic messaging services. Furthermore, the second class of device and subordinate carrier that are described here as not being fully compliant with the operating standards of the first class of device and first carrier (for example because of reduced capability) may nonetheless be compliant with their own standards. Furthermore, the functionality described herein as regards both the first and second classes of device and carriers might comply with different aspects of a future standard, for example a future release of the LTE standards.

Figure 2:
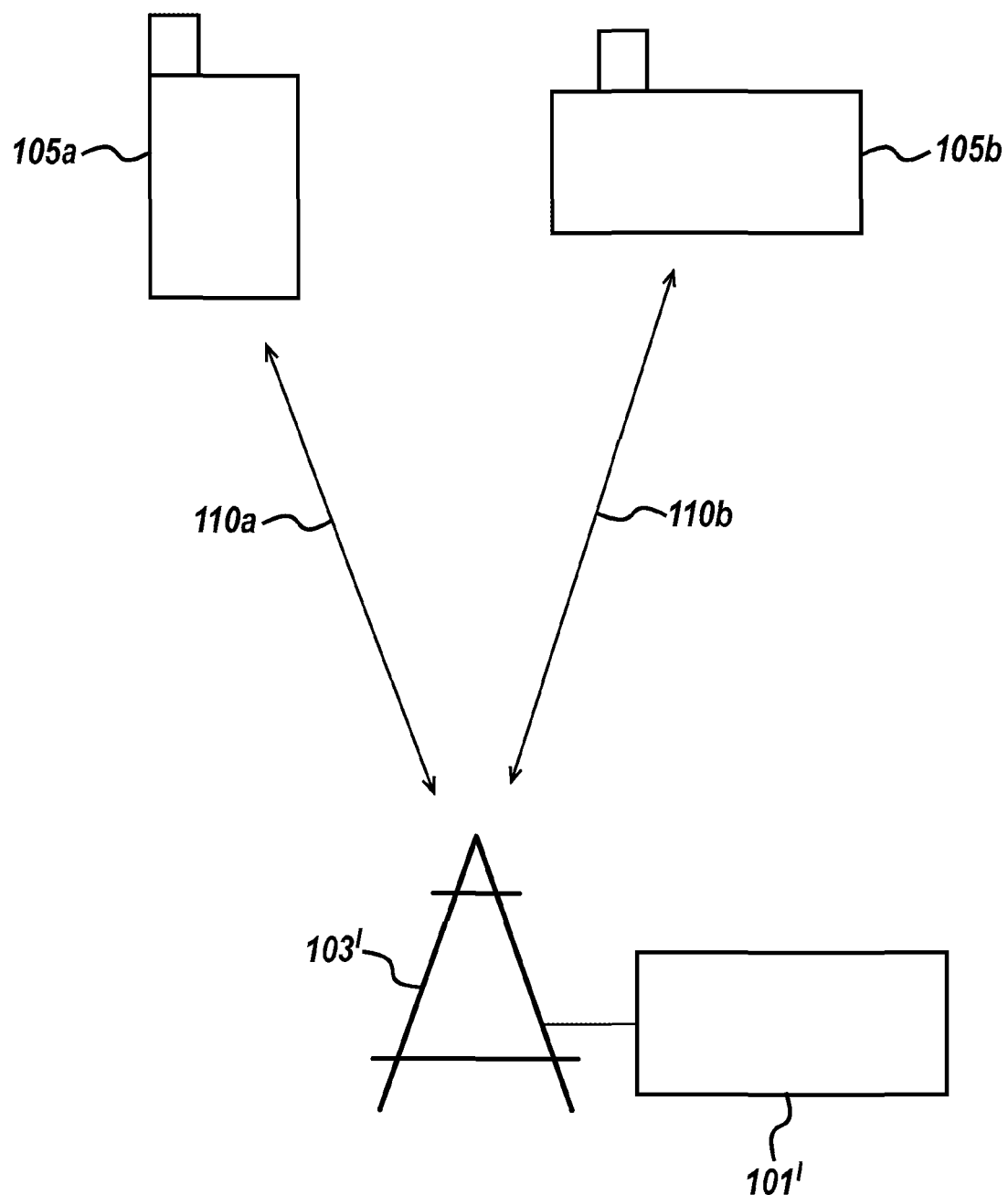
FIG. 2 schematically represents elements of a mobile telecommunications system for implementing embodiments of the invention.

Referring now to FIG. 2, a base station 101' is shown communicatively connected to an LTE device 105a via a transceiver unit 103' and a first (host) earner 110a, and communicatively connected to an MTC device 105b via the transceiver unit 103' and a second (subordinate) carrier 110b. The base station 101' is responsible for a coverage area in which both the LTE device 105a and the MTC device 105b are located. The single base station 101' is able to communicate on both the first carrier 110a and the second carrier 110b. The first carrier 110a is a host carrier having a broad bandwidth, while the second carrier 110b is a subordinate carrier having a narrower bandwidth located within the frequency band of the host earner. As will be explained in more detail below, the time and frequency resources of the first (host) carrier and the second (subordinate) carrier are logically separate for the purposes of data transmission and most control signalling, but some time and frequency resources are accessible to and used by devices connected to both the first and second carriers.

Host Carrier and Subordinate Carrier Overview

Figure 3:
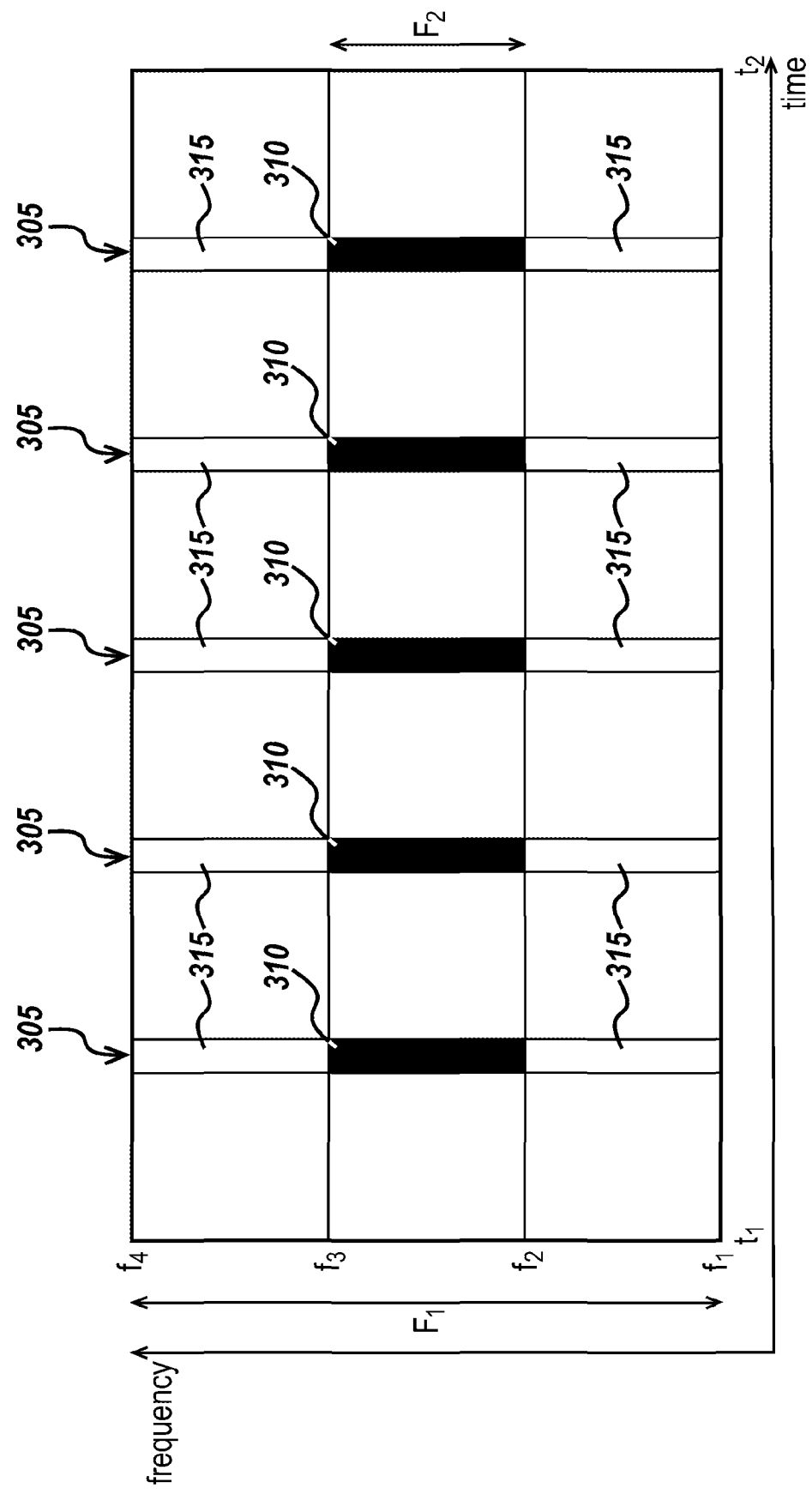
FIG. 3 schematically represents a time and frequency resource allocation between a host carrier and a subordinate carrier.

Referring to FIG. 3, the time and frequency resources constituting the host carrier and the subordinate carrier are schematically illustrated. The horizontal axis of FIG. 3 is time, with a time period from $t_1$ to $t_2$ being shown in FIG. 3. The vertical axis of FIG. 3 is frequency, the frequency increasing from a frequency $f_1$ to a frequency $f_4$. The host carrier has a frequency band $F_1$, extending from the frequency $f_1$ to the frequency $f_4$. The subordinate earner has a frequency band $F_2$, extending from a frequency $f_2$ to a frequency $f_3$. The subordinate carrier is intended primarily for use by terminal devices which do not have the capability to receive or transmit between the frequencies $f_1$ and $f_2$, and between the frequencies $f_3$ and $f_4$. The subordinate carrier does not occupy all of the time and frequency resources within the frequency band $F_2$. Instead, certain time periods 305 of the frequency band $F_2$ are allocated to the subordinate carrier (and potentially to other subordinate carriers), with the unallocated time periods within the frequency band $F_2$ forming part of the host carrier resources. The shaded portions 310 of FIG. 3 indicates those time and frequency resources allocated to the subordinate carrier. When a time period 305 is allocated to the subordinate carrier, the time and frequency resources 315 falling outside of the frequency band $F_2$ (but within the frequency band $F_1$) are not allocated to the subordinate carrier. In some implementations these time and frequency resources may be available to the host carrier (or to another subordinate earner having a different (and non-overlapping) frequency band). In other implementations these time and frequency resources may be "lost" and unusable by either the first type of device or the second type of device. It is envisaged that the central frequency and bandwidth of the frequency bands $F_1$ and $F_2$ would be fixed for a given host carrier/subordinate carrier, although implementations in which they are not fixed may be possible. The particular time periods allocated to the subordinate carrier may be fixed, or may be dynamically variable, for example to increase or decrease the amount of radio resources allocated to the subordinate carrier to adapt to traffic conditions of the subordinate carrier (and/or possibly of the host carrier).

Radio Frame and Resource Grid Structure

Figure 4:
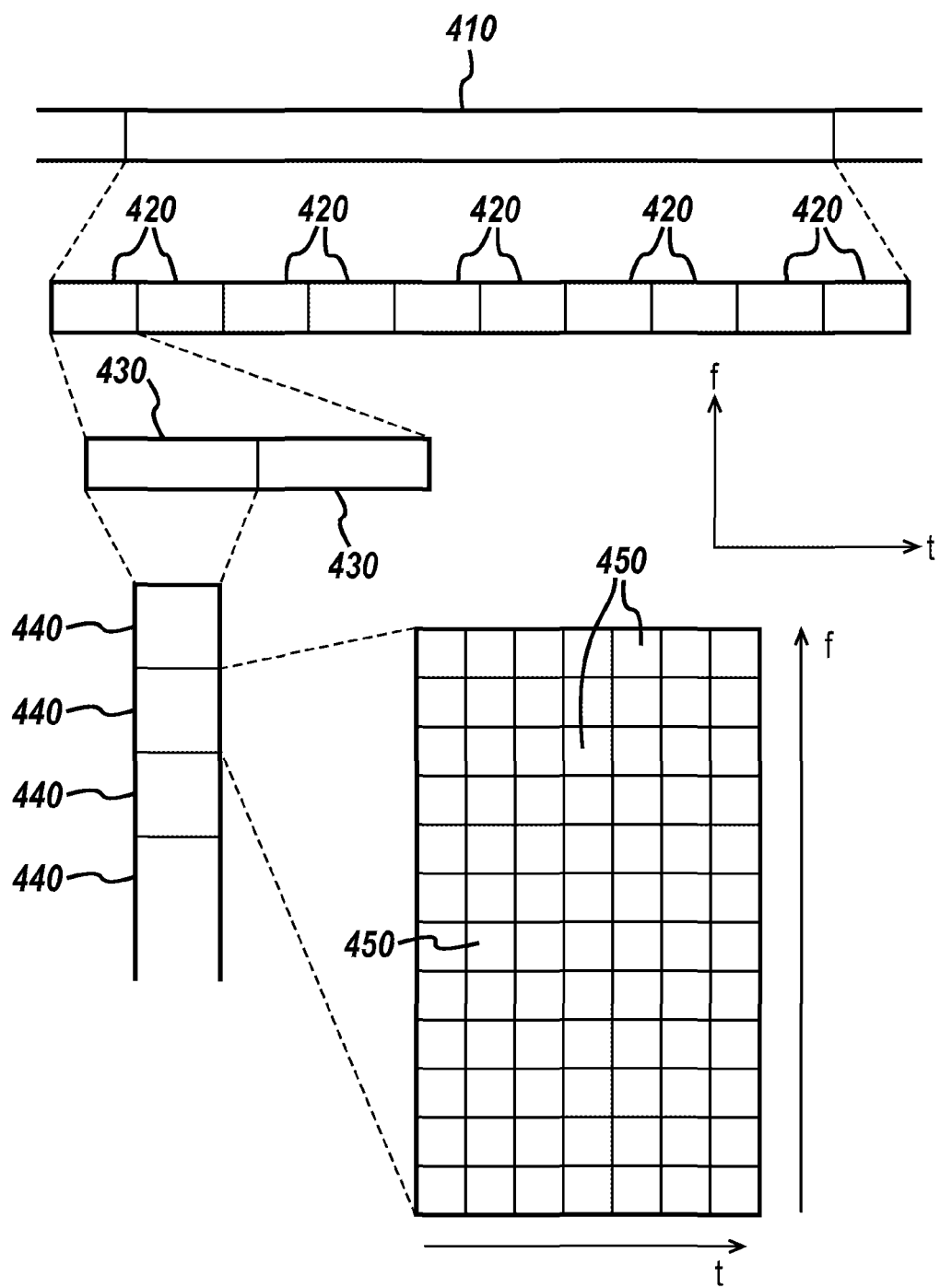
FIG. 4 schematically illustrates a radio frame and resource grid structure of time and frequency resources.

Referring now to FIG. 4, a radio frame and resource grid structure for an LTE type network is schematically illustrated. At the top of FIG. 4, a radio frame 410 is shown. This occupies the full width of the frequency band of the host carrier, and has a duration of 10 ms. The radio frame 410 is one of a sequence of radio frames which are used to communicate data between a base station and a terminal device. The radio frame 410 comprises 10 sub-frames 420, which again occupy the fully width of the frequency band of the host carrier. Each of these sub-frames 420 has a duration of 1 ms. Each of the sub-frames 420 comprises two slots 430, each slot occupying the full width of the frequency band of the host carrier and having a duration of 0.5 ms. Each slot comprises a plurality of resource blocks 440 in the frequency direction, and only a single resource block 440 in the time direction. In other words each resource block 440 has a duration of 0.5 ms (the same as the duration of the slot 430), but occupies only a portion of the bandwidth of the host carrier. Each resource block 440 comprises a two-dimensional array of resource elements 450 distributed in both the time direction and the frequency direction. Each resource element 450 has a length (duration) of one modulation symbol, and a frequency range of one subcarrier (e.g. 15 kHz). In the present case the resource block 440 has a dimension of 12 resource elements 450 in the frequency dimension and 7 resource elements 450 in the time dimension, resulting in an overall bandwidth of 12 subcarriers and a duration of 7 symbols.

In operation, data transmissions between a base station and a terminal device may be scheduled to use particular resource blocks. This scheduling is usually carried out by the base station or a related network entity. Certain resource blocks may be permanently allocated to carry predetermined signalling information.

3GPP LTE Releases 8, 9 and 10 (Rel. 8/9/10) define 6 downlink transmission bandwidth configurations from 1.4 MHz to 20 MHz representing the use of 6, 15, 25, 50, 75 or 100 resource blocks. As noted above, all Rel. 8/9/10 terminal devices are required to support the maximum single carrier bandwidth of 20 MHz for compliance with the Rel. 8/9/10 standards. Nevertheless, for all bandwidth configurations Rel. 8/9/10 has specified that basic physical layer synchronisation signals (Primary Synchronisation Signals—PSS, and Secondary Synchronisation Signals—SSS), and the most fundamental system information (Master Information Block—MIB) is transmitted using only the central 6 resource blocks which are receivable with a 1.4 MHz transceiver. However, in order to receive the remainder of the carrier system information the terminal device is required to be able to receive the full bandwidth of the carrier.

However, and as also noted above, for some applications, for example in situations relating to machine type communications (MTC) and/or dedicated messaging networks (DMN), there is a drive to build low cost and hence low capability devices. Ideally, device simplification should permit a reduction in required bandwidth of operation as well as reduction of features and throughput. Terminal devices with a lower bandwidth capability than that specified for Rel. 8/9/10 may mean that such devices are unable to operate properly on Rel. 8/9/10 compliant networks which specify higher bandwidth capabilities. For example, terminal devices with a lower bandwidth capability may not even be able to receive any more system information than that contained in the MIB of a Rel. 8/9/10 compliant network.

Low capability devices will ideally be able to find and camp-on the carrier associated with their target dedicated messaging network(s) even in the presence of Rel. 8/9/10 higher bandwidth carriers. Furthermore, there is a desire that DMN carriers are not swamped by Rel. 8/9/10 capable devices camping-on the DMN, even though the Rel. 8/9/10 capable devices are in the coverage area of a higher bandwidth Rel. 8/9/10 carrier which they could otherwise use.

Subordinate Carrier Definition

As described in relation to FIG. 3, the subordinate carrier resources (for use by MTC devices) may be defined by a certain bandwidth in the frequency domain (frequency band $F_2$ in FIG. 3 for example) and a certain pattern of time periods in the time domain. The certain pattern of time periods may be a sequence of subframes as described above with reference to FIG. 4. The sequence of subframes may be a sequence of MBSFN subframes as defined by signalling within SystemInformationBlockType2 (SIB2) of the legacy LTE host carrier. However, it will be recognised that the subordinate carrier may be delineated by other means, for example by scheduling by a base station. The pattern of subframes may be a subset (or all) of those subframes reserved by the information element mbsfh-SubframeConfigList in the host carrier SIB2.

Conveniently, non-MTC UEs will read SIB2 of the legacy LTE host carrier and determine that a configured pattern of subframes are reserved for other purposes (such as MBMS, relay or as in the present case MTC subordinate carrier operation). The non-MTC UEs will therefore ignore the subframes allocated to the subordinate carrier. The configured pattern of reserved subframes is defined in a flexible manner by the information element mbsfn-SubframeConfigList.

In particular, mbsfn-SubframeConfigList comprises a set of 1 or more subframe allocations each of which is defined by the following fragment of ASN.1 from TS 36.331:

```
MBSFN-SubframeConfig ::=      SEQUENCE
    radioframeAllocationPeriod    ENUMERATED {n1, n2, n4, n8, n16, n32},
    radioframeAllocationOffset    INTEGER (0 .. 7),
    subframeAllocation            CHOICE
        oneFrame                      BIT STRING (SIZE(6)),
        fourFrames                    BIT STRING (SIZE(24))
    }
}
```

For a given allocation, the "radioframeAllocationPeriod" indicates the periodicity, in radio frames, with which MBSFN subframes are included in the allocation, "n1" indicates that MBSFN subframes are present in every radio frame, while "n2" indicates that MBSFN subframes are present in every other radio frame. A radioframeAllocationPeriod of "n32" indicates that one in every 32 radio frames includes one or more MBSFN subframes. Radio-frames that contain MBSFN subframes occur when equation SystemFrameNumber mod radioFrameAllocationPeriod=radioFrameAllocationOffset is satisfied. In other words, the radioframeAllocationOffset parameter sets an offset for a start position of the repeating pattern of radio frames. The subframeAllocation parameter defines the subframes that are allocated for MBSFN within the radio frame allocation period defined by the radioFrameAllocationPeriod and the radioFrameAllocationOffset parameters. The subframe allocation can either be specified for a single radio frame within the radio frame allocation period (oneFrame) or for four consecutive radio frames within the radio frame allocation period (fourFrames). The subFrameAllocation parameter is a 6 bit (oneFrame) or 24 bit (fourFrame) mask, indicating whether each of 6 (oneFrame) or 24 (fourFrame) predetermined subframes are to be reserved. The LTE specification places restrictions on which subframes may be reserved for other purposes by this method, in order that there is no conflict with the requirement to receive system information and paging. In an FDD LTE system one or more of subframes 1, 2, 3, 6, 7 and 8 may be reserved for other purposes. In a TDD LTE system the subframes that may be reserved are 3, 4, 7, 8 and 9. The system frame number can be derived from the MIB of the host carrier.

Figures 5C, 5D:
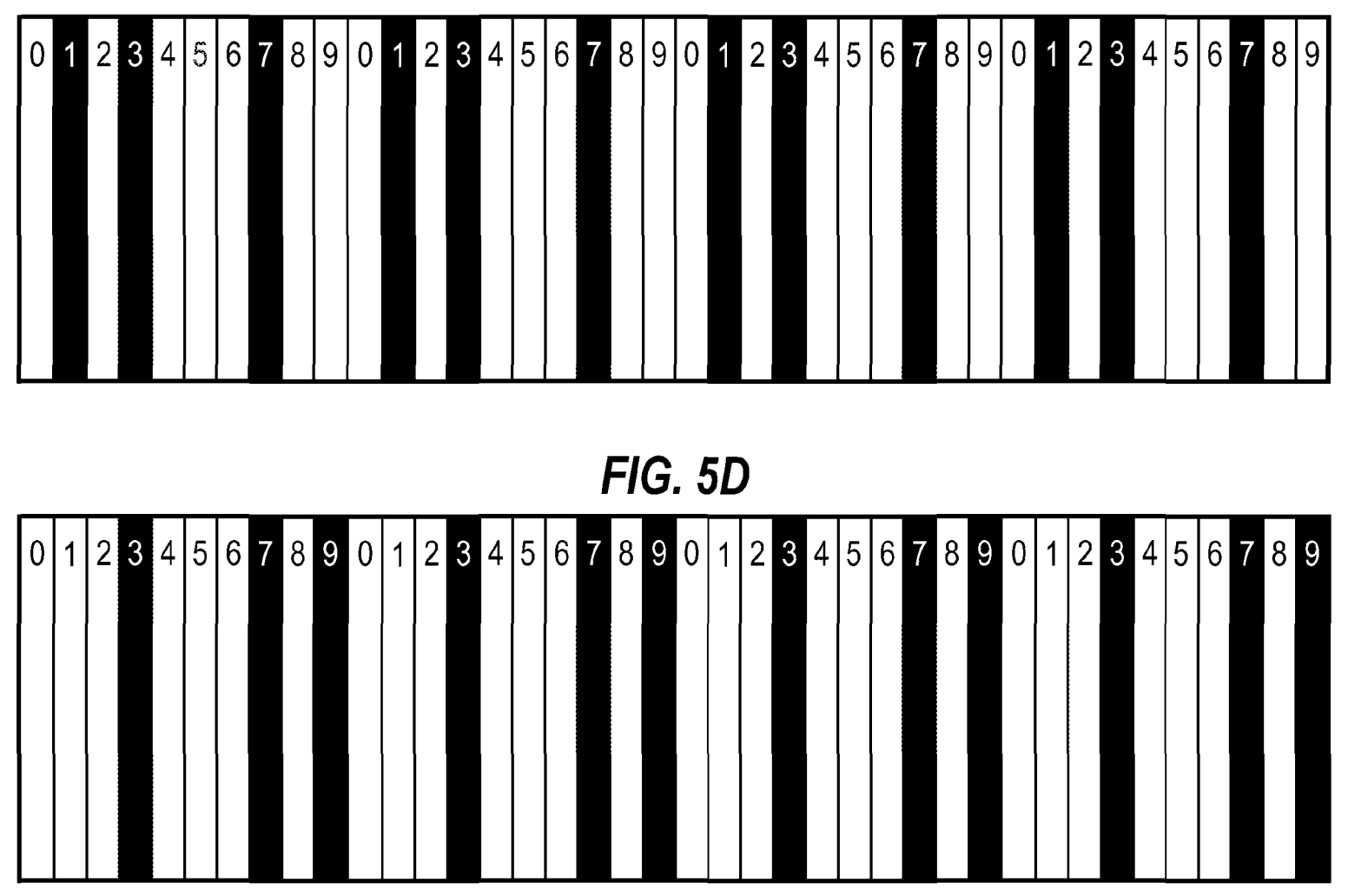

FIGS. 5A to 5D are example subframe patterns. Each of FIGS. 5A to 5D shows a portion of a repeating pattern which could be specified by mbsfn-SubframeConfigList or by a similar pattern specifying function. Four radio frames having ten subframes each are shown in FIGS. 5A to 5D. The subframes are labelled from 0 (zero) to 9 (nine). The shaded subframes are those allocated to the subordinate carrier, with the unshaded subframes being retained for use on the host carrier. FIG. 5A schematically illustrates an FDD pattern in which radioFrameAllocationPeriod is set to n2 (MBSFN subframes present in every other radio frame), the radioFrameAllocationOffset is 0 (zero) and the subframeAllocation mask is 111111 (thereby selecting each of subframes 1, 2, 3, 6, 7 and 8). It will be appreciated that this subframe allocation is a "oneFrame" allocation. A longer bit string would be used for the subframeAllocation if subframes were to be provided over four consecutive radio frames.

FIG. 5B schematically illustrates a TDD pattern based on the same parameters as FIG. 5A. Specifically, radioFrameAllocationPeriod is set to n2 (MBSFN subframes present in every other radio frame), the radioFrameAllocationOffset is 0 (zero) and the subframeAllocation mask is 11111x (thereby selecting each of subframes 3, 4, 7, 8 and 9). It should be noted that the last bit of the mask is not used for TDD. The difference between FIGS. 5A and 5B results from the different subframes mapped to the bit mask in the FDD and TDD schemes.

FIG. 5C schematically illustrates an FDD pattern in which radioFrameAllocationPeriod is set to n1 (MBSFN subframes present in every radio frame), the radioFrameAllocationOffset is 0 (zero) and the subframeAllocation mask is 101010 (thereby selecting each of subframes 1, 3 and 7). It will be appreciated that this subframe 615 allocation is a "oneFrame" allocation. A longer bit string would be used for the subframeAllocation if subframes were to be provided over four consecutive radio frames.

FIG. 5D schematically illustrates a TDD pattern based on the same parameters as FIG. 5A. Specifically, radioFrameAllocationPeriod is set to n1 (MBSFN subframes present in every radio frame), the radioFrameAllocationOffset is 0 (zero) and the subframeAllocation mask is 10101x (thereby selecting each of subframes 3, 7 and 9). It should be noted that the last bit of the mask is not used for TDD. Again, the difference between FIGS. 5C and 5D results from the different subframes mapped to the bit mask in the FDD and TDD schemes. All of the patterns shown in FIGS. 5A to 5D will repeat until the mbsfn-SubframeConfigList is altered. The set of allocation patterns specified in mbsfn-SubframeConfigList, which is signalled in SIB2, defines the "reserved set". A sub-set of the allocation patterns could be used to define the subordinate earner. Also, two mutually exclusive sub-sets could be used to define two separate subordinate carriers delimited in the time domain.

It will be appreciated that this mechanism provides a great deal of flexibility in how much carrier resource is to be allocated to the subordinate carrier, and also how that resource is distributed with respect to time. The minimum (non-zero) amount of resources (in the time domain) which can be allocated is 1 in 320 subframes (when radioframeAllocationPeriod is set to n32 and only one bit is set in the subframeAllocation bit mask). The maximum amount of resources (in the time domain) which can be allocated is 192 in 320 subframes (when radioframeAllocationPeriod is set to n1 and all six bits are set in the subframeAllocation bit mask). In some implementations the allocation might be static to provide a fixed resource subordinate carrier. The fixed resources could in this case be known to a terminal device in advance. In other implementations the allocation might be dynamic, resulting in a subordinate carrier having a resource allocation which can be increased or decreased to for example meet traffic loading conditions on the subordinate carrier and/or on the host carrier. These increases or decreases could be based on requests from terminal devices for additional resource, or based on decisions made at the base station or a related entity. An increase in the amount of resources allocated to the subordinate carrier could be achieved either by altering the parameters of an existing subframe allocation as defined above, or by adding a new subframe allocation according to the principles set out above. A decrease in the amount of resources allocated to the subordinate carrier could be achieved either by altering the parameters of an existing subframe allocation as defined above, or by removing an existing subframe allocation.

In other words, it is possible to use multiple subframe allocations to achieve allocation patterns which would not be possible with a single subframe allocation, and to provide a simple way of increasing (or decreasing, if one of multiple subframe allocations is removed) the amount of resources allocated to the subordinate carrier. In one implementation, a first subframe allocation with a relatively low allocation period and subframe allocation could be used to maintain a low resource subordinate carrier which can be camped onto by a low capability terminal device, and then further subframe allocations could be added to service the communication needs of the low capability terminal device when it has successfully camped on. In this way, the resources available to the host carrier are retained at a high level to serve LTE traffic when the subordinate carrier is not in use. Signalling the presence of the Subordinate Carrier Certain resource blocks may be used to carry control signalling including synchronisation signals and system information. As explained above, a problem can therefore arise if essential control signalling from the base station is transmitted outside of the frequency range which can be received by a low-capability device. Fortunately, as described above, the synchronisation signals and the Master Information Block (MIB) of the system information are present within a frequency range which is likely to be receivable by a low-capability device. However, further system information, carried in System Information Blocks (SIBs), and the associated control signalling may be transmitted at a frequency which cannot be received by the low-capability device. This would cause problems, potentially preventing the low-capability device from being able to camp on to the network. It will be appreciated that not all host carriers will necessary support a subordinate carrier. If a low-capability device attempts to camp-on to a network which does not support a subordinate carrier then the camp-on procedure will ultimately fail. This is a waste of time and power for the low-capability device.

It would therefore be desirable to signal to an MTC UE which has restricted reception bandwidth the presence of an MTC subordinate carrier within a larger bandwidth LTE carrier accessible to legacy UEs (LTE Rel. 8/9/10 UEs). It was discussed above that for all LTE bandwidths (Rel. 8/9/10) the basic physical layer synchronisation signals and the most important system information (Master Information Block) is transmitted using only the central 6 resource blocks (72 subcarriers). The Master Information Block (MIB) is transmitted in the Physical Broadcast Channel (PBCH) which is allocated to the central 72 subcarriers and to just the first 4 OFDMA symbols of the second slot of every 10 ms radio frame. Thus, assuming that the low bandwidth MT UE is able to receive at least 6 resource blocks in the frequency domain, then the PBCH (for example the MIB) may be used to signal the presence of an MTC subordinate carrier.

Figure 6:
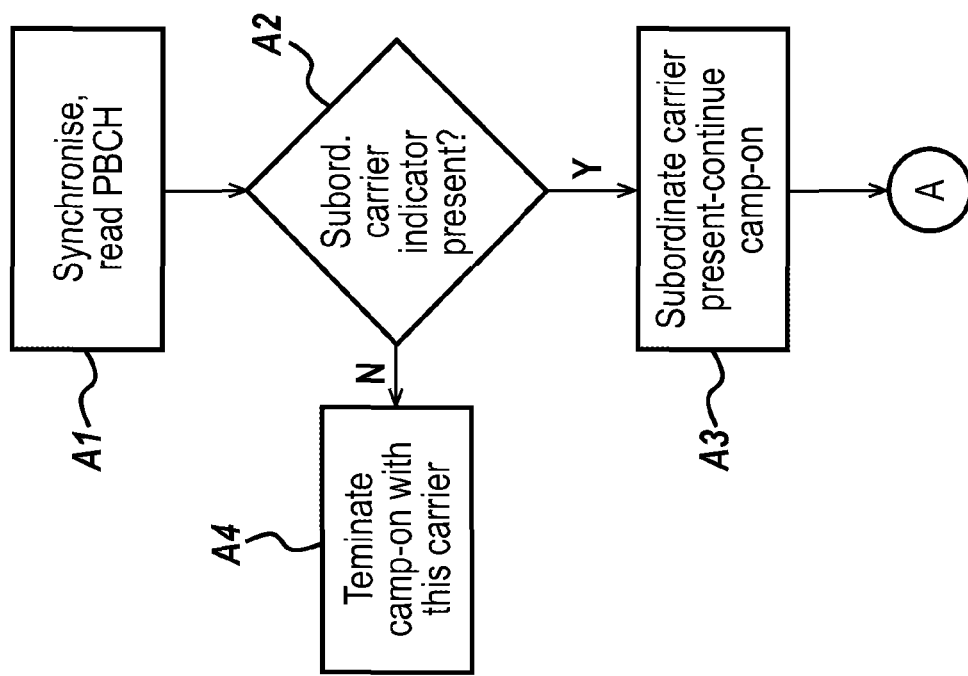
FIG. 6 is a schematic flow diagram of a first part of a camp-on procedure for connecting to the subordinate carrier.

In FIG. 6, a schematic flow diagram of a first part of a camp-on procedure is shown. At a step A1, an MTC device seeking to camp-on to a subordinate carrier, for example following power-up, seeks to identify and decode PSS (Primary Synchronisation Signals) and SSS (Secondary Synchronisation Signals) signalling being broadcast in its location. Once the MTC device synchronises to a carrier using the PSS and SSS, the MTC device determines the frame timing and proceeds to decode the PBCH to determine the MIB for the carrier. At a step A2, the MTC device determines whether or not a subordinate carrier indicator flag is present in the MIB. The MTC subordinate carrier indicator flag may be signalled in one (or more) of the MIB bits that are spare in LTE Release 8/9/10 (10 bits are currently spare). If the MTC device determines that the MIB contains a subordinate carrier indicator flag then the camp-on process continues at a step A3. If on the other hand the MTC subordinate carrier indicator flag was found not to be present, then the camp-on procedure to this carrier would be terminated. This would allow the device to decide upon proceeding with camp-on (or not) simply based upon decoding of the legacy LTE MIB, and to discontinue with camp-on immediately after the decoding of the legacy LTE MIB should the subordinate carrier indicator flag not be present. As an alternative to using the MIB to signal the presence of a subordinate carrier, a subordinate carrier indicator signal could be provided at a known time/frequency somewhere other than in the MIB. The particular time/frequency may be defined referentially with respect to the MIB (for example).

The subordinate carrier indicator signal may be relative to the host carrier PBCH and/or the System Frame Number conveyed in the host carrier PBCH/MIB. In this case the MTC device would, following synchronisation (at the step A1), search for the subordinate carrier indicator signal at the expected time/frequency (at the step A2). If it is found, then the MTC device knows that one (or more) subordinate carriers are present and continues its discovery of the MTC subordinate carrier and the subsequent camp-on process.

In either implementation, it will be appreciated that the presence of the subordinate carrier indicator is derivable by the MTC device without being required to decode any system information block (SIB) of the host carrier since the MTC device may be unable to receive the host carrier SIBs which are signalled across the full host carrier frequency band F1.

If the MTC device does not find a subordinate carrier associated with the host carrier, then it may search for and seek to camp-on to another carrier by returning to the step A1 to seek to synchronise with and decode PBCH for a different carrier.

Signalling the Bandwidth of the Subordinate Carrier(s)

Having detected the presence of an MTC subordinate carrier the UE needs to determine the bandwidth of the subordinate carrier in order to be able to read the further system information which will contain the other characteristics of the subordinate carrier. There are a number of alternative ways in which the subordinate carrier bandwidth may be signalled to the MTC UE:

(1) The simplest method is to fix the bandwidth of the subordinate carrier in the 3GPP specifications. Having detected the presence of a subordinate carrier in the manner described above, the MTC UE would know by definition the MTC subordinate carrier bandwidth (e.g. 1.4 MHz, 3 MHz or 5 MHZ).

(2) The downlink bandwidth of the MTC subordinate carrier may be signalled in the legacy LTE MIB. For example if the subordinate carrier indicator flag were signalled in the PBCH by using a 2 bit field, 4 states could be signalled (absence of a subordinate earner and three different subordinate carrier bandwidths, e.g. 1.4 MHz, 3 MHz and 5 MHZ).

(3) The downlink bandwidth (and possibly other characteristics) of the MTC subordinate carrier could be signalled in a Subordinate Carrier Master Information Block (scMIB). The scMIB would be signalled in fixed time/frequency resources, known in advance to the mobile terminal and preferably defined in the 3GPP specifications. The possibilities for signalling the scMIB are described in the following section.

Signalling the Subordinate Carrier Master Information Block (scMIB)

In the above section three methods of determining the downlink bandwidth of an MTC subordinate carrier by an MTC UE have been described. The first two of these methods involve a priori knowledge of when decoding of the subordinate carrier begins. The last of the described methods involves signalling the downlink bandwidth in a Master Information Block of the subordinate carrier itself.

A Master Information Block may be regarded as collection of parameters giving values to configurable characteristics of the carrier and other information to achieve/maintain radio frame synchronisation. A Master Information Block is required to be supplied in fixed time/frequency resources and must be received and decoded before a more flexible scheme of downlink message exchange may be employed. According to the above description, at the point at which the UE tries to decode the scMIB, the UE will know:

That an MTC subordinate carrier is present (from the indicator flag/signal).

The subordinate carrier centre frequency (it may generally be assumed that this will be the same as the centre frequency of the host legacy LTE carrier).

In addition the UE may know the MTC subordinate carrier bandwidth, if this has been fixed in the specifications, conveyed in the host carrier MIB or conveyed by some other a priori means. In order to receive and decode the scMIB the UE must be able to determine in which resource elements it is carried. The number of resource elements used for the scMIB could be related to the subordinate carrier bandwidth or it could be fixed (as is the case for the legacy LTE MIB). If the number of resource elements were defined to be dependent upon the subordinate carrier bandwidth, this would require the value of the subordinate carrier bandwidth to be known a priori. There are a limited number of spare bits available in the legacy host carrier LTE MIB, and so it may be considered that there are not sufficient available to use 1 or more of these to carry subordinate carrier bandwidth information. In this case, the UE will not have a priori knowledge of the subordinate carrier bandwidth so the UE will be unable to derive the scMIB resource elements from the bandwidth. Accordingly, for the purposes of the following description it is assumed that the scMIB is always signalled in a fixed set of resource elements defined within the 3GPP specifications. Nonetheless, it should be understood that the present invention is not limited to this, and that in certain implementations the set of resource elements used to convey the scMIB may not be fixed.

The fixed set of resource elements is contained within a subset (or all) of those subframes reserved by one (or more) of the subframe allocations configured in the information element mbsfn-SubframeConfigList broadcast in the host carrier SIB2. The fixed subframe allocation to convey the scMIB should:

Be frequent enough to occasion an acceptable latency for acquisition of the scMIB by MTC UEs.

Not be too frequent that excessive resources are consumed from the host carrier and subordinate carrier.

It should be noted that it is common for MTC devices to exhibit low mobility and be able to tolerate comparatively high latencies in message transmission. However, this may not be the case with all possible MTC traffic and it is therefore preferable that the frequency of MIB transmission be fixed within the 3GPP specification and thus cannot be configured dependent upon the expected MTC traffic characteristics.

Various fixed characteristics of the scMIB transmission scheme, including the following, should preferably be defined within the 3GPP specifications:

The number, periodicity and relationship to host carrier System Frame Number of the subframes used for scMIB.

The level of repetition encoding employed.

Within the subframes used, the number and location of resource elements used to convey the scMIB (that is, exactly which slot(s), subcarriers and symbols are to be used).

The number of resource elements used for the scMIB will be a function of the number of bits of information that must be conveyed by this method, which will be influenced by the further details of the subordinate carrier design, but the number will also be constrained by the overhead that this imposes. The System Frame Number, necessary for the UE to maintain radio frame synchronisation, upon which many LTE higher layer processes are dependent, may be read from the host carrier MIB. However, for efficiency reasons it is likely that once the UE synchronises to the subordinate carrier, it would be undesirable for the UE to have to keep re-reading the host carrier MIB to maintain this information. Thus, System Frame Number is likely to be carried by the scMIB, although the UE might depend upon the host carrier MIB for this information.

Any combination of parameters conforming to and fully resolving the definition of MBSFN-SubframeConfig may be chosen to define which subframes convey the scMIB. However, use of a single subframe allocation pattern will provide a solution involving least complexity. For example a single pattern comprising a single subframe allocation once per radio frame allocation period of 32 frames and with an offset value of zero may be considered adequate to convey the scMIB dependent upon other details of the subordinate carrier design. Alternatively, if more MIB bits are required then a shorter allocation period of, for example, 16 or 8 radio frames could be used and/or more subframes per allocation period. Note that while the subframes used to convey the scMIB may be defined by such a subframe allocation pattern or patterns, not all slots or resource elements in the subframes defined by the pattern(s) are necessarily used to convey the scMIB. Use of a shorter allocation period but sparse use of the resource elements for the scMIB may offer the best compromise in relation to scMIB acquisition time and resource overhead.

The subframe allocation pattern or patterns chosen to define the subframes used for the scMIB will be included in the mbsfn-SubframeConfigList of SIB2 of the host carrier in order to reserve these subframes for special use within the context of the host carrier. However, low bandwidth MTC UEs searching for a suitable subordinate carrier will not be required to read SIB2 of the host carrier to gain this information, since the subframe allocation pattern(s) for the scMIB will be fixed and defined in the 3GPP specifications.

Camp-on Procedure

Figure 7:
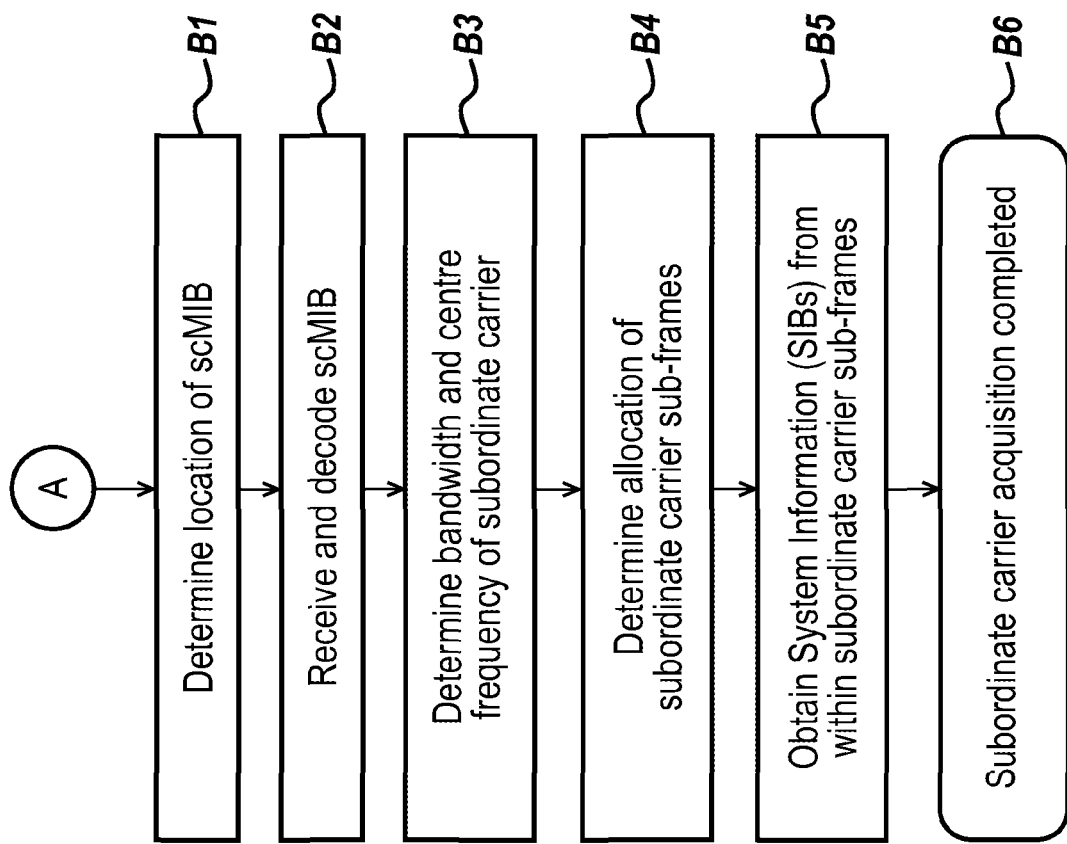
FIG. 7 is a schematic flow diagram of a second part of the camp-on procedure for connecting to the subordinate carrier.

Referring to FIG. 7, the camp-on procedure following the initial steps shown in FIG. 6 is schematically illustrated. At a step B1 the location of the scMIB is determined. As discussed above, the location of the scMIB is likely to be fixed in the 3GPP standards, and so the MTC UE will be able to frame synchronise with the scMIB broadcast by comparing the location of the scMIB (radio frame and sub-frame known from the 3GPP specifications) with the current System Frame Number (which the MTC UE can derive from the host carrier MIB). At a step B2 the scMIB is received and decoded, whereby the system information specified therein can be acquired and used. At a step B3 the bandwidth and central frequency of the subordinate carrier is determined. The bandwidth of the subordinate carrier may be determined by one of the methods described above in the section "Signalling the Bandwidth of the Subordinate Carrier(s)". The central frequency may be assumed to be the same as that of the host carrier, but in some implementations may have a different central frequency which would need to be signalled to the MTC UE. The central frequency and bandwidth together identify the frequency band forming the subordinate carrier. Note that if the bandwidth is not determined from the scMIB then the step B3 can be performed before (or in parallel with) the steps B1 and B2.

At a step B4, the allocation of subordinate carrier subframes is determined. An indication of those subframes allocated to the subordinate carrier may be specified in the scMIB. As described above, sub-frames are allocated to the subordinate carrier using a subordinate carrier sub-frame allocation set which determines which sub frames within a repeating group of radio frames are allocated to the subordinate carrier. At a step B5, further system information (System Information Blocks) relating to the subordinate carrier is obtained from subframes allocated to the subordinate carrier. This further system information can be used to complete the camp on procedure of the MTC UE to the subordinate carrier at a step B6. The further system information may be at a fixed location within the radio resources of the subordinate carrier, or at a location within the radio resources of the subordinate carrier which has been scheduled by the base station, or a combination of both.

In FIG. 8, example signalling on the host carrier and the subordinate carrier is schematically illustrated. In FIG. 8, eight radio frames 800 are shown, each having a central frequency portion 820 usable by both the host carrier and the subordinate carrier, and outer frequency portions 810 usable only by the host carrier. In each radio frame, a MIB 830 is provided in the central frequency portion 820. The MIB 830 is readable by devices using both the host carrier and the subordinate carrier. Devices seeking to use a subordinate carrier may be able to determine from the MIB 830 whether a subordinate carrier exists based on a flag present in the MIB 830. In an outer frequency portion 810, system information 840 is provided for use by devices served by the host carrier. The system information 840 is shown to be outside of the central frequency portion 820 and is thus not available to the kind of low-capability devices intending to use the subordinate carrier. It will be appreciated that some system information may happen to be transmitted within the central frequency portion 820, but this cannot be guaranteed. The system information 840 is provided in the form of System Information Blocks (SIBs). Unlike the Master Information Block which is broadcast on the Physical Broadcast Channel (PBCH), the SIBs are mapped onto the Physical Downlink Shared Channel (PDSCH). Generally, the Master Information Block 830 provides sufficient information to gain access to the first of the System Information Blocks (SIB1), which in turn provides sufficient information to gain access to SIB2 et seq. SIB2 includes parameters relating to the reservation of MBSFN subframes (as described above). Legacy LTE devices using the host carrier will therefore be informed of the subframes reserved for use by the subordinate carrier (or for other purposes, for example MBMS or relay backhaul) when they decode SIB2. They will therefore know that these subframes cannot be used and to ignore them. Within the central portion 810 of some or all of the radio frames (every other radio frame in this example) is a portion 850 allocated to the subordinate carrier. For the sake of clarity the portion 850 shown in FIG. 8 is contiguous, but it will be appreciated from FIGS. 5A to 5D for example that this may not be the case. The portions 850 are used to transmit data and signalling to low capability devices using the subordinate carrier. Within the allocated portion 850 of the first radio frame is a subordinate carrier MIB (scMIB) 860 carrying various information required for a low capability device to acquire the remainder of the subordinate carrier system information.

Within the allocated, portion 850 of the second radio frame is system information 870 relating to the subordinate carrier. This system information 870 provides information required for a terminal device to camp on to the subordinate carrier. It will be appreciated that the locations of the scMIB 860 and the system information 870 is purely exemplary. The important point is that the scMIB 860 and the system information 870 are conveyed in the allocated portions 850.

As described in detail above, the location and periodicity of the scMIB would probably be fixed (predetermined). The system information 870, which could be conveyed in the form of System Information Blocks in a similar manner to with the host carrier, may be predetermined, or dynamically allocated (scheduled), depending on implementation.

In the host carrier, the MIB and any associated SIBs together provide the parameters necessary for system access using the host carrier. Similarly, in the subordinate carrier, the scMIB and any associated SIBs carried in subframes allocated to the subordinate carrier provide the parameters necessary for system access using the subordinate carrier. In both cases, the UE (legacy or MTC) requires the MIB to decode the shared channel (and thus access SIBs). The MIB contains downlink system bandwidth of the host carrier and the system frame number.

The above embodiment describes a method of conveying a subordinate carrier for low bandwidth devices within a portion of a larger host carrier using for example MBSFN subframe allocation pattern(s) to reserve subframes for the subordinate carrier. This permits a flexible and efficient definition of a subordinate carrier within a host carrier. An indication of the presence of the MTC subordinate carrier is provided using a flag in the host carrier MIB. This may require the 3GPP standard to be updated, but will not require any change to legacy LTE devices because the flag is set in current spare bits which can and will be ignored by a legacy device. Various methods of signalling subordinate carrier downlink bandwidth have been described, including fixing the MTC subordinate carrier bandwidth in 3GPP specifications, signalling the subordinate carrier downlink bandwidth via a field in host carrier MIB, or signalling using a bit field within the subordinate carrier MIB (scMIB). A method of defining the subframes used for the subordinate carrier Master Information Block by using fixed (defined in 3GPP specifications) subframe allocation pattern(s) in relation to the System Frame Number of the host carrier has also been described above. A subordinate carrier has been described (in one example) to be specified using a repeating pattern of sub-frames. A mechanism to specify this already exists in LTE, originally for the purpose of specifying sub-frames for use in MBSFN.

It will be appreciated that various modifications can be made to the embodiments described above without departing from the scope of the present invention as defined in the appended claims. In particular although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, mobile terminal etc. Furthermore, although the term base station has been used interchangeably with e-nodeB it should be understood that there is no difference in functionality between these network entities.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and Toskala A. "*LTE for UMTS OFDMA and SC-FDMA based radio access*", John Wiley and Sons, 2009.

What is claimed is:

1. A base station comprising:
   a transceiver; and
   a processor, operatively coupled to the transceiver, wherein:
   the transceiver and the processor are configured to:
   transmit at least one signal in a first bandwidth portion of a cell, the at least one signal having a primary synchronization signal (PSS), a secondary synchronization signal (SSS) and a physical broadcast channel (PBCH), the PBCH includes a master information block (MIB), the MIB includes an indication of a system frame number, the MIB having an indication of time and frequency resources in relation to the at least one signal to acquire additional system information, the first bandwidth portion having a bandwidth less than a full bandwidth of the cell,
   transmit in time and frequency resources associated with the indication of the time and frequency resources, additional system information, the additional system information indicates a second bandwidth portion of the cell, the acquired additional system information being acquired within the second bandwidth portion, and
   send a first time interval allocation and to transmit data in time intervals indicated in the first time interval allocation and send a second time interval allocation and to transmit data in time intervals indicated by both the first time interval allocation and the second time interval allocation.

2. The base station of claim 1 wherein the cell is a time division duplex (TDD) cell.

3. A method performed by a base station, the method comprising:
   transmitting, at least one signal in a first bandwidth portion of a cell, the at least one signal having a primary synchronization signal (PSS), a secondary synchronization signal (SSS) and a physical broadcast channel (PBCH), the PBCH including a master information block (MIB), the MIB includes an indication of a system frame number, the MIB having an indication of time and frequency resources in relation to the at least one signal to acquire additional system information, the first bandwidth portion having a bandwidth less than a full bandwidth of the cell, and
   transmitting, in time and frequency resources associated with the indication of the time and frequency resources, additional system information, the additional system information indicating a second bandwidth portion of the cell, the acquired additional system information being acquired within the second bandwidth portion, and
   sending a first time interval allocation and transmitting data in time intervals indicated in the first time interval allocation and sending a second time interval allocation and transmitting data in time intervals indicated by both the first time interval allocation and the second time interval allocation.

4. The method of claim 3 wherein the cell is a time division duplex (TDD) cell.

5. A non-transitory computer readable storage medium storing instructions, the instructions when executed by a processor of a base station, cause the processor to execute a method comprising:
   transmitting, at least one signal in a first bandwidth portion of a cell, the at least one signal having a primary synchronization signal (PSS), a secondary synchronization signal (SSS) and a physical broadcast channel (PBCH), the PBCH including a master information block (MIB), the MIB includes an indication of a system frame number, the MIB having an indication of time and frequency resources in relation to the at least one signal to acquire additional system information, the first bandwidth portion having a bandwidth less than a full bandwidth of the cell, and
   transmitting, in time and frequency resources associated with the indication of the time and frequency resources, additional system information, the additional system information indicating a second bandwidth portion of the cell, the acquired additional system information being acquired within the second bandwidth portion, and
   sending a first time interval allocation and transmitting data in time intervals indicated in the first time interval allocation and sending a second time interval allocation and transmitting data in time intervals indicated by both the first time interval allocation and the second time interval allocation.

6. The non-transitory computer readable storage medium of claim 5, wherein the cell is a time division duplex (TDD) cell.

* * * * *